June 19, 1934.  J. W. WHITE  1,963,479
BRAKE
Filed June 12, 1929

Inventor
JOHN WILLIAM WHITE by Roberts, Cushman and Woodberry

His Attorneys

Patented June 19, 1934

1,963,479

UNITED STATES PATENT OFFICE 1,963,479

BRAKE

John William White, Buffalo, N. Y.

Application June 12, 1929, Serial No. 370,171

16 Claims. (Cl. 188—79.5)

This invention relates to an improvement in a brake system and more particularly in the means for adjusting the position of the brake shoes relative to the shoe actuator. For a complete disclosure of one form of hydraulic braking mechanism in which this invention might be embodied attention is called to my copending application, Serial No. 317,933, filed November 8, 1928.

Because of wear and other reasons it is necessary to adjust the brake shoes from time to time so that they will function most efficiently when the brakes are applied. This is a well known requirement and many different means have been provided most of which are objectionable because the complete or partial disassembly of the mechanism is a necessary prerequisite to their operation.

The primary object of this invention is to provide an adjusting device which can easily be altered when the brake mechanism is fully installed, such access thereto being provided that the adjustment can be made without disturbing the brake assembly and which means includes elements supported by but not secured either to the brake shoes or to the shoe actuator.

A further object of the invention is to provide an adjusting means which comprises an element which can be quickly assembled with or disassembled from the brake mechanism with a minimum of labor and expense.

Other objects will appear to one skilled in the art from a consideration of the following specification taken in connection with the drawing which forms a part thereof and in which Fig. 1 is a side elevation partly in section of a portion of a brake mechanism embodying this invention;

Figure 1:
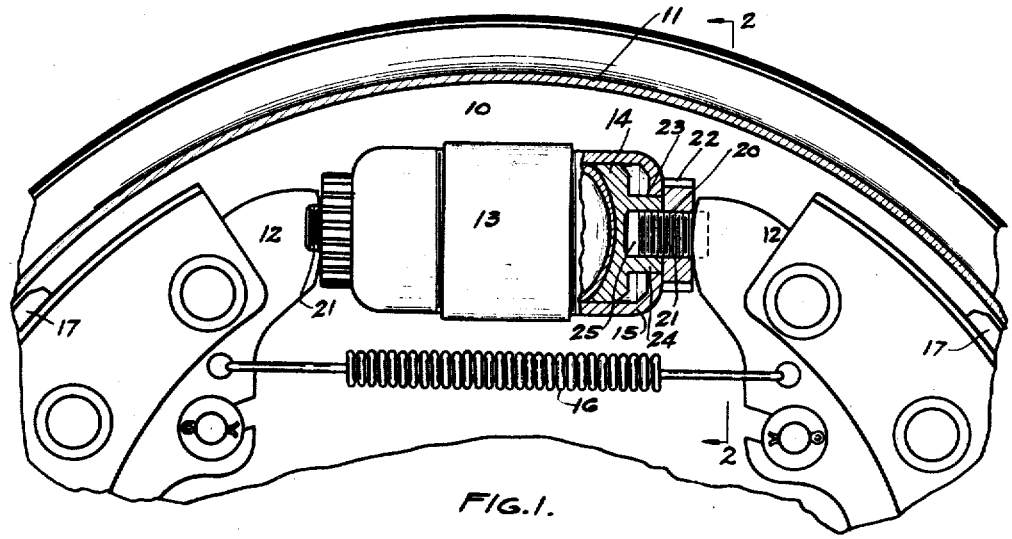
Figure 2:
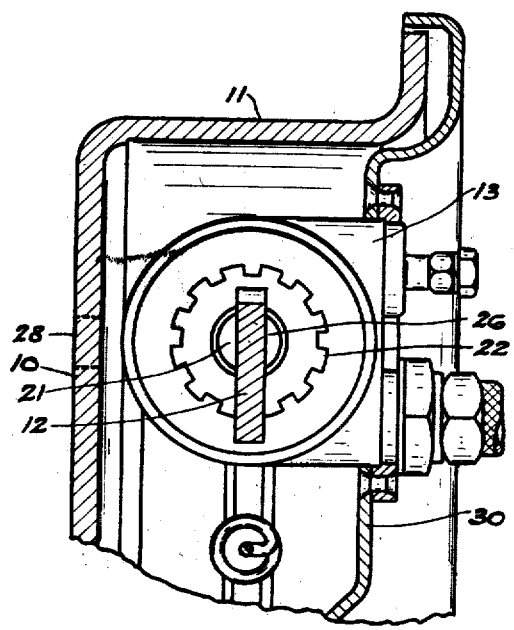
Fig. 2 is an enlarged sectional view taken along the line 2—2 of Fig. 1.
Figure 3:
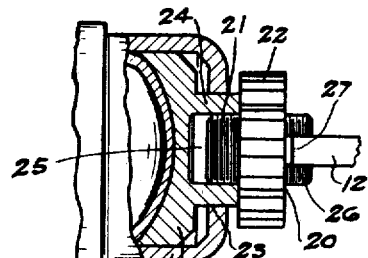
Fig. 3 is a plan view partly in section of an adjusting means illustrating its relation to the shoe actuator and to the brake shoe.

The drawing illustrates the invention as applied to a braking mechanism of the hydraulic type such as is shown in the copending application above mentioned, but it will be understood that it is not limited thereto and that it can be employed in connection with other types of braking mechanisms.

The brake mechanism in which this means is shown as embodied comprises a brake drum 10 having a braking ring 11, brake shoes 12 and a brake actuator, in the present instance a wheel cylinder 13, by which the shoes 12 are operated. Upon the introduction of fluid into the cylinder 13 opposed pistons 14, within a casing 15, are caused to separate. The transmission of this motion of the pistons to the shoes 12 forces them out of the normal position determined by a spring 16 and brings the brake linings 17 carried by the shoes into contact with the braking ring 11.

This movement of the pistons 14 is transmitted to the shoes 12 by the adjusting devices 20 which constitute the present invention and which will now be described in detail. Each device 20 comprises an externally threaded rod 21 and a nut 22 engaging such rod. In each end of the casing 15 is formed an opening 23 which receives a boss 24 on the piston, the boss being preferably, though not necessarily, integral with the piston on which it is mounted. One end of the rod 21 rests freely in a central pocket 25 formed in the boss 24 while the other end is provided with a transverse slot 26 of such dimensions as to receive the edge of the shoe 12.

The nut 22 rests against the outer end of the boss 24 and is held in such contact by the action of the spring 16 upon the shoe 12. The rod 21, is held against rotation by its engagement with the shoe and upon the rotation of the nut 22 moves longitudinally to determine the relation of the shoe and the cylinder. The drawing shows the shoes in their most contracted position so that upon rotation of the nuts 22 the rods 21 will advance and the bases 27 of the slots 26 will bear upon the shoes and cause them to separate.

The nuts 22 are held at all times against the ends of the bosses 24 by the spring 16 so that when the cylinder is energized the rods 21 will be caused by the nuts to move with the pistons 14 and actuate the shoes. In order to permit adjustment of the device 20, openings 28 are formed in the wall of the drum 10 through which a screw driver or similar tool may be inserted to rotate the nut and thus adjust the device in the desired manner. Similar openings (not shown) in the brake flange 30 upon which the cylinder 13 is supported may be provided either in addition to or in place of the openings 28.

When the brake mechanism is assembled the adjusting devices are dropped into the pockets 25 and turned so that the ends of the shoes 12 enter the slots 26 and the necessary adjustments are made later after the assembly has been completed. The slotted engagement between the shoes 12 and rods 21 which prevents the rotation of the rods is merely one way of carrying out this function and while it is preferable it will be understood that other means employed for this purpose which do not require securement of the rods to the shoes will come within the spirit and scope of this invention.

The constant pressure of the spring 16 holds the faces of the nuts 22 in close contact with the ends of the bosses 24 or with the ends of the cylinder casing at all times. Thus the nuts will be held frictionally against unwanted rotation despite the vibration and jarring to which they must be subjected.

While one embodiment of the invention has been shown and described in detail I am not limited thereto since other embodiments might be made without departing from the inventive concept set forth in the following claims.

I claim:

1. In a hydraulic brake mechanism the combination with the brake cylinder and the brake shoe, of an adjusting device, the cylinder comprising a casing having an opening therein, a piston reciprocable in said casing, and a boss on said piston entering said opening and having a pocket therein, and the device comprising a rod, one end of which enters said pocket freely, the other end coacting with the brake shoe, and a nut rotatable on said rod, the rod being held against rotation and the nut being held in contact with the boss by the coaction of the rod and shoe.

2. The combination with a brake drum, of a brake shoe therein, an actuating member for the shoe, and an adjusting device disposed between the actuator and shoe and freely slidably engaging both the actuator and shoe.

3. The combination with a brake drum, of a brake shoe therein, a reciprocatory member in substantial alignment with one end of the shoe, and means establishing a connection between the reciprocatory member and shoe comprising an adjusting device having the ends thereof freely slidably engaging both said member and shoe.

4. The combination with a brake drum, of a brake shoe therein, a reciprocatory actuating member in substantial alignment with one end of the shoe, means establishing a connection between the member and shoe including a threaded element having the opposite ends freely slidably engaging the member and shoe, and means for varying the length of the connection aforesaid comprising a nut threaded upon said element between the adjacent ends of the member and shoe in abutting relation to said member.

5. The combination with a brake drum, of a brake shoe therein, a reciprocatory actuator in substantial alignment with the end of the shoe, means establishing an operative connection between the actuator and shoe including a member loosely engaging the adjacent ends of the actuator and shoe and having a non-rotative connection with one of the latter, resilient means for retracting the shoe operable to hold the same in contact with said member and for maintaining the latter in assembled relation with the actuator, and means for varying the length of the connection between the actuator and shoe.

6. The combination with a brake drum, of a brake shoe located within the drum, a reciprocatory actuating member arranged in substantial alignment with one end of the shoe in spaced relation thereto, means establishing a connection between the adjacent ends of the actuator and shoe comprising a member having one end non-rotatably and slidably engaging the shoe and having the opposite end telescopically engaging the actuator, resilient means for maintaining the shoe in engagement with the member and for holding the latter in assembled relation with the actuator, and a nut threaded upon the member intermediate the adjacent ends of the shoe and actuator in abutting relation to the actuator for varying the effective length of the connection between the latter and shoe.

7. The combination with a brake drum, of a brake shoe located within the drum, a reciprocatory actuating member arranged in substantial alignment with one end of the shoe in spaced relation thereto, means establishing an operative connection between the adjacent end of the actuator and shoe comprising a threaded element having a slot in one end for receiving the adjacent end of the actuator and having the opposite end freely slidably engaging the actuator, resilient means for retracting the shoe operable to hold the latter in engagement with the slot in said member and for maintaining the member in engagement with the actuator, and a nut threaded upon the member intermediate the adjacent ends of the actuator and shoe in abutting relation to the actuator.

8. The combination with a brake drum, of a brake shoe located within the drum, a reciprocatory actuator arranged in substantial alignment with one end of the shoe in spaced relation thereto, means establishing an operative connection between the actuator and shoe including a member reciprocably mounted within the actuator and normally held from rotation, and a nut threaded upon said member intermediate the shoe and actuator in abutting relation to the latter for varying the effective length of the connection between the actuator and shoe.

9. The combination with a brake drum, of a brake shoe located within the drum, a reciprocatory actuator having a recess in one end thereof, means establishing a connection between the adjacent ends of the actuator and shoe comprising a threaded element having one end detachably slidably engaging within said recess and having the opposite end non-rotatably slidably engaging the shoe, resilient means normally urging the shoe into engagement with said member for holding the same in assembled relation to the actuator, and a nut interposed between the adjacent ends of the actuator and shoe and threaded upon said member in abutting relation to the actuator.

10. The combination with a brake drum, of a brake shoe therein, an actuating member for the shoe, means establishing an operative connection between the actuator and shoe including a member having the opposite end portions loosely engageable with the actuator and shoe permitting the same to be readily assembled with and removed from the latter, and means upon said member between the actuator and shoe for varying the effective length of the connection therebetween.

11. The combination with a brake drum, of a brake shoe therein, an actuating member for the shoe, an adjusting device disposed between the actuator and shoe, said device including a member having one end freely sleeved within the adjacent end of the actuator and having the opposite end loosely and non-rotatably engageable with the shoe, and means upon the member intermediate the shoe and actuator for varying the space therebetween.

12. The combination with a brake drum and brake friction means within said drum, of an actuator for the brake friction means comprising a cylinder and a piston within the cylinder, and adjusting means interposed between the cylinder and brake friction means and automatically locked in its adjusted position by engagement with the piston.

13. The combination with a brake drum and brake friction means within said drum, of an actuator for said brake friction means comprising a cylinder and a piston reciprocably mounted within the cylinder, adjusting means interposed between the cylinder and brake friction means and accessible for adjustment exteriorly of the brake drum, said adjusting means being automatically locked in its adjusted position by its engagement with the piston.

14. The combination with a brake drum and brake friction means within the drum, of an actuator for said brake friction means comprising a housing and a plunger reciprocably mounted within said housing, an adjusting device comprising, a member movable freely relative to the plunger and operatively connected to the said friction means, and a second member adjustable longitudinally of the member aforesaid and adapted to abut both the plunger and housing.

15. The combination with a brake drum and brake friction means within the drum, of an actuator for the brake friction means comprising a reciprocable plunger, an adjusting device interposed between the plunger and brake friction means and comprising, a member movable freely relative to said plunger and operatively connected to the brake friction means, and a second member adjustable longitudinally of the member aforesaid and adapted to abut said plunger.

16. The combination with an enclosed brake drum and brake friction means within said drum, of an actuator for said brake friction means comprising a cylinder and a piston reciprocably mounted within said cylinder, adjusting means interposed between said cylinder and said brake friction means including a revoluble member peripherally notched to be engageable with and operable by a screw driver or like tool, the enclosure for said drum being apertured for the insertion of the tool, said adjusting means being automatically locked in its adjusted position by its engagement with said piston.

JOHN WILLIAM WHITE.

DISCLAIMER 1,963,479.—*John William White*, Buffalo, N. Y. BRAKE. Patent dated June 19, 1934. Disclaimer filed November 25, 1938, by the assignee, *Bendix Products Corporation*.

Hereby enters this disclaimer of claim 8 of said patent.
[*Official Gazette December 13, 1938.*]

inder and brake friction means and automatically locked in its adjusted position by engagement with the piston.

13. The combination with a brake drum and brake friction means within said drum, of an actuator for said brake friction means comprising a cylinder and a piston reciprocably mounted within the cylinder, adjusting means interposed between the cylinder and brake friction means and accessible for adjustment exteriorly of the brake drum, said adjusting means being automatically locked in its adjusted position by its engagement with the piston.

14. The combination with a brake drum and brake friction means within the drum, of an actuator for said brake friction means comprising a housing and a plunger reciprocably mounted within said housing, an adjusting device comprising, a member movable freely relative to the plunger and operatively connected to the said friction means, and a second member adjustable longitudinally of the member aforesaid and adapted to abut both the plunger and housing.

15. The combination with a brake drum and brake friction means within the drum, of an actuator for the brake friction means comprising a reciprocable plunger, an adjusting device interposed between the plunger and brake friction means and comprising, a member movable freely relative to said plunger and operatively connected to the brake friction means, and a second member adjustable longitudinally of the member aforesaid and adapted to abut said plunger.

16. The combination with an enclosed brake drum and brake friction means within said drum, of an actuator for said brake friction means comprising a cylinder and a piston reciprocably mounted within said cylinder, adjusting means interposed between said cylinder and said brake friction means including a revoluble member peripherally notched to be engageable with and operable by a screw driver or like tool, the enclosure for said drum being apertured for the insertion of the tool, said adjusting means being automatically locked in its adjusted position by its engagement with said piston.

JOHN WILLIAM WHITE.

DISCLAIMER 1,963,479.—*John William White*, Buffalo, N. Y. BRAKE. Patent dated June 19, 1934. Disclaimer filed November 25, 1938, by the assignee, *Bendix Products Corporation*.

Hereby enters this disclaimer of claim 8 of said patent.
[*Official Gazette December 13, 1938.*]